US008974224B2

(12) United States Patent
Stanley (10) Patent No.: US 8,974,224 B2
(45) Date of Patent: Mar. 10, 2015

(54) POSITION-LOCKING APPARATUS FOR INSERT AND OVER MOLDING OF DELICATE COMPONENTS

(76) Inventor: Craig M. Stanley, Campbell, CA (US)

( * ) Notice: Subject to any disclaimer, the term of this patent is extended or adjusted under 35 U.S.C. 154(b) by 198 days.

(21) Appl. No.: 13/043,289

(22) Filed: Mar. 8, 2011

(65) Prior Publication Data
US 2012/0228799 A1  Sep. 13, 2012

(51) Int. Cl.
*B29C 45/64* (2006.01)
*B29C 45/14* (2006.01)

(52) U.S. Cl.
CPC .............. *B29C 45/14* (2013.01); *B29C 45/64* (2013.01)
USPC ........... 425/595; 425/121; 425/123; 425/125; 264/271.1; 264/272.11; 264/272.15; 264/275; 264/276; 264/277; 264/278; 264/279

(58) Field of Classification Search
USPC .............. 425/121, 123, 125, 595; 264/271.1, 264/271.11, 272.15, 275, 276, 277, 278, 264/279
See application file for complete search history.

(56) References Cited

U.S. PATENT DOCUMENTS

| | | | | |
|---|---|---|---|---|
| 3,729,573 A * | 4/1973 | Dunn | ........................... | 174/16.3 |
| 4,184,835 A * | 1/1980 | Talbot | ........................... | 425/577 |
| 4,365,792 A * | 12/1982 | Johns | ........................... | 269/24 |
| 4,470,786 A | 9/1984 | Sano et al. | | |
| 4,932,640 A * | 6/1990 | Shirakawa | ........................... | 269/32 |
| 5,182,032 A | 1/1993 | Dickie et al. | | |
| 5,639,403 A | 6/1997 | Ida et al. | | |
| 6,196,821 B1 * | 3/2001 | Chen | ........................... | 425/125 |
| 6,503,436 B1 | 1/2003 | Koguchi et al. | | |
| 7,396,222 B2 | 7/2008 | Saito | | |
| 7,559,763 B2 * | 7/2009 | Cipkar | ........................... | 425/577 |
| 2005/0227043 A1 * | 10/2005 | Schoemann et al. | ........................... | 264/255 |
| 2009/0194909 A1 * | 8/2009 | Hoogland | ........................... | 425/577 |

\* cited by examiner

*Primary Examiner* — Timothy Kennedy
(74) *Attorney, Agent, or Firm* — Womble Carlyle Sandridge & Rice, LLP (57) ABSTRACT

Method and apparatus for overmolding delicate parts are disclosed. A mold unit for an injection molding apparatus can be provided. The mold unit can include a clamping mechanism and a locking mechanism. The clamping mechanism can be positioned in contact with the delicate part. The position of the clamping mechanism can be selected such that the clamping mechanism does not exert a force that damages the delicate part. The delicate part can vary in size from part to part. Thus, as the overmolding process is repeated, the position that is selected each time for the clamping mechanism can vary depending on the size of a part that is used. The locking mechanism can be configured to lock the clamping mechanism into the position selected for the part.

20 Claims, 8 Drawing Sheets

POSITION-LOCKING APPARATUS FOR INSERT AND OVER MOLDING OF DELICATE COMPONENTS

BACKGROUND

1. Field of the Described Embodiments

The described embodiments relate generally to methods of injection molding. More particularly, methods of overmolding parts including delicate components are described.

2. Description of the Related Art

Injection molding is a manufacturing process where a part can be formed using a thermoplastic or a thermosetting plastic material. An initially solid material can be melted and forced into a mold cavity at a high pressure to ensure the melted material entirely fills the mold cavity. Then, the melted material can be allowed to cool such that it sets in a shape specified by the mold cavity configuration. An advantage of injection molding is that parts with complex geometries can be mass produced in a cost effective manner.

One type of injection molding is often referred to as overmolding or insert molding. In overmolding, a separate part can be placed into a mold in an injection molding unit and material can be injected around the separate part to form a new part. The material added around the initial part can be shaped according a mold cavity in the mold that surrounds the separate part. The separate part can have been formed using an injection molding process. However, the separate part can also have been formed using some other manufacturing process which is unrelated to injection molding.

In an overmolding process or an insert molding process, the mold cavity can be formed from a number of mold components. The mold components can be configured to interact such that they can be brought together to form the mold cavity and then separated. The mold components can be brought together to inject the mold material around a part initially placed into the mold. The mold components can be separated to allow a part to be initially placed into the mold cavity or a newly formed part including the part initially placed into the mold and the added material to be removed from the mold.

If the part initially placed in the mold is delicate, the positioning of the mold components relative to the part can be an issue. As part of the overmolding process or insert molding process, one or more of the mold components can be brought into contact with a portion of the part where the contact between the part and the mold components defines a portion of the overmolding shape. If the mold components contact the part with too much force, then the delicate part can be damaged. This is undesirable. However, if the mold components are not held against the delicate part with sufficient force, then the injection molding material can flow around the delicate part into areas in which it is not intended such that a molding flash is formed. The molding flash is undesirable because it may be necessary to remove the molding flash to allow the newly formed part to be used as it is intended. If removing the molding flash is too difficult, parts with an unacceptable molding flash can be discarded. However, discarding unsatisfactory parts requires an inspection methodology to determine, which parts are acceptable and which parts need to be discarded. This is also undesirable.

In view of the foregoing, there is a need for improved methods and apparatus for overmolding or insert molding on delicate parts.

SUMMARY OF THE DESCRIBED EMBODIMENTS

Method and apparatus for overmolding or insert molding delicate parts are disclosed. The overmolding or insert molding process can involve adding material around apart initially placed in a mold using an injection molding process. The initial part can be delicate. For example, it can be delicate because it includes fragile components, such as electrical circuitry, that can be damaged if too much force is applied to the initial part to secure it in place during the overmolding or insert molding process. As another example, the initial part can be delicate because it is formed from a fragile material, such as a glass, which can be damaged if too much force is applied to the initial part. In one embodiment, a fragile part with electronic circuitry can be overmolded to form a component used in electronic headphones. However, the described apparatus and methodology is suitable for reliable overmolding or insert molding delicate parts in many different applications and the example of electronic headphones is provided for the purposes of illustration only.

In one aspect, a mold unit for an injection molding apparatus can be provided. The mold unit can include a clamping mechanism and a locking mechanism. The clamping mechanism can be positioned in contact with the delicate part. The position of the clamping mechanism can be selected such that the clamping mechanism does not exert a force that damages the delicate part. The delicate part can vary in size from part to part. Thus, as the overmolding process is repeated, the position that is selected each time for the clamping mechanism can vary depending on the size of a particular delicate part that is used. The locking mechanism can be configured to lock the clamping mechanism into the position selected for each delicate part.

In one embodiment, a mold unit can include 1) a cavity for receiving an injection molding material where the cavity is formed from bounding surfaces associated with one or more mold unit components; 2) a first mold unit component for supporting an initial part wherein the injection molding material is injected around at least a portion of the initial part in accordance with a shape of the cavity; 3) a second mold unit component configured to move relative to the first mold unit component and the initial part such that, in a first position in which injection molding is initiated, the second mold unit component is placed in contact with a portion of the initial part; 4) a force generating mechanism, coupled to the second mold unit component, configured to affect the first position of the second mold unit component relative to the first mold unit such that an amount of force exerted by the second mold unit component on the initial part is constrained below a threshold force value to prevent the initial part from being damaged by the second mold unit component; and 5) a third mold unit component. The third mold unit component can be configured to 1) move relative to the first mold unit component and the second mold unit component and 2) form a portion of the shape of the cavity where the third mold unit component can include a locking mechanism for locking the second mold unit component in the first position as affected by the force generating mechanism when the third mold unit is brought towards the first mold unit component and the second mold unit component.

In another embodiment, an injection molding apparatus can be provided. The injection molding unit can include 1) an injection unit for melting and injecting an injection molding material into a cavity in a mold unit; 2) one or more actuators for moving components of the mold unit; 3) a mold unit. The mold unit can include a) a cavity for receiving injection molding material from the injection molding unit during an overmolding process; b) a support structure configured to receive a delicate part and position the delicate part within the cavity; c) a clamping mechanism, coupled to the one or more actuators, configured to move relative to the support structure and clamp the delicate part in place where a position where the delicate part is clamped depends on a size of the delicate part; d) a force generating mechanism coupled to the clamping mechanism configured to adjust the position of the clamping mechanism relative to the delicate part such that the clamping mechanism does not damage the delicate part; and e) a locking mechanism configured to move relative to the clamping mechanism such that it can be i) brought into contact with the clamping mechanism to prevent the clamping mechanism from moving from the position adjusted by the force generating mechanism during an overmolding process and ii) moved away from the clamping mechanism after the overmolding process is complete so that the clamping mechanism can be moved away from the support structure to allow an overmolded part to be removed from the support structure.

In yet another embodiment, a method of injection molding can be provided. The method of injection molding can include: 1) determining a damage tolerance of a delicate part that is to be overmolded via the injection molding; 2) placing the delicate part in a mold unit of an injection molding apparatus; 3) positioning a clamping mechanism in contact with the delicate part wherein the clamping mechanism is configured to contact the delicate part with a force below its determined damage tolerance and wherein a position of the clamping mechanism when it contacts the delicate part depends on a size of the delicate part which can vary from part to part; 4) locking the clamping mechanism into place at the position where the clamping mechanism is in contact with the delicate wherein a locking mechanism is configured to hold the clamping mechanism in the position during the injection molding to prevent flash from being formed around an overmolded part during the injection molding; 5) assembling a cavity around the delicate part wherein a portion of the cavity is formed from surfaces associated with the clamping mechanism; 6) injecting an injection molding material into the cavity; 7) dissembling the cavity; and 8) removing the overmolded part.

BRIEF DESCRIPTION OF THE DRAWINGS

The embodiments will be readily understood by the following detailed description in conjunction with the accompanying drawings, wherein like reference numerals designate like structural elements, and in which:

FIG. 4B shows a stack-up for attaching a corner bracket to the housing in accordance with the described embodiments.

DESCRIBED EMBODIMENTS

In the following paper, numerous specific details are set forth to provide a thorough understanding of the concepts underlying the described embodiments. It will be apparent, however, to one skilled in the art that the described embodiments may be practiced without some or all of these specific details. In other instances, well known process steps have not been described in detail in order to avoid unnecessarily obscuring the underlying concepts.

An injection molding apparatus can include a mold unit for forming a melted material, such as a thermoplastic, into a particular shape. The particular shape can be determined by a shape of a cavity in the mold unit into which a molten material can be injected at a high pressure. In an overmolding process, the particular shape can be formed around a pre-formed initial part placed in the mold unit. The initial part can be formed using injection molding. However, injection molding does not have to be used to form initial part and, materials and/or processes not compatible with injection molding can be used to form the initial part.

The mold unit typically includes a number of components that are configured to be moved relative to one another. For instance, to allow the initial part to be placed in the mold unit or a newly formed overmolded part including the initial part to be removed from the mold unit, the mold unit typically can include a number of components that can be separated from one another. To perform the overmolding, the separate components in the mold unit can be configured move closer together such that a cavity is formed around the initial part in the mold unit. The configuration of the cavity determines the overmolded shape that is formed around the initial part.

Two types of tools that can be used in a mold unit to overmold other parts are a force-determined tool and a positioned-determined tool. In a force-determined tool, a slider or some other tool part can be used in the mold unit. The slider can be clamped onto the initial part that is to be overmolded. To prevent flash during the overmolding, a high clamping force can be required. A disadvantage of a force-determined tool is that if the initial part is delicate, a high clamping force can destroy or damage the initial part that is inserted into the mold unit and thus, result in an overmolded part that is unsuitable for its intended purposes.

In a positioned-determined tool, a slider or some other tool part can again be used in the mold unit. The movement of the slider can be limited such that little or no force is placed on the part. For instance, the slider can be brought to a precise position, which is repeated each time an initial part is overmolded. A disadvantage of this approach is that if the initial part varies in size from part to part, then a larger part can be crushed by moving the slider to a fixed position while a smaller part can be overmolded with significant flash.

With respect to the following figures, a method and apparatus are described that can overcome the disadvantages associated with the force-determined tools and the position-determined tools. In particular, a first component in a mold unit can be configured to position a tool part, such as a slider, such that it clamps onto an initial part placed in the mold unit with a low clamping force. The clamping force applied by the first component can be controlled such that it does not exceed a threshold force value above which the initial part can be damaged. The threshold force value of the first component can be configured to accommodate different parts that are more or less fragile. Further, the first component can be configured to accommodate initial parts with some size variation. Thus, the clamping position of a slider or other tool can vary depending on the size of the initial part.

A second component in the mold unit can be configured to lock the first component into place in its clamped position. This locking mechanism can prevent the first component from moving out of position during the injection process as a result of the injection pressure. If the threshold force value applied by the first component is lower than the force from the injection pressure, then the first component can be pushed away from the initial part during the injection process resulting in flashing in unwanted areas on the initial part. The locking mechanism can lock the first component into place such that it remains clamped to the initial part during the injection process and hence prevent the formation of unwanted flash on the part. These and other embodiments are discussed below with reference to FIGS. 1A-7. However, those skilled in the art will readily appreciate that the detailed description given herein with respect to these figures is for explanatory purposes only and should not be construed as limiting.

Figure 1A:
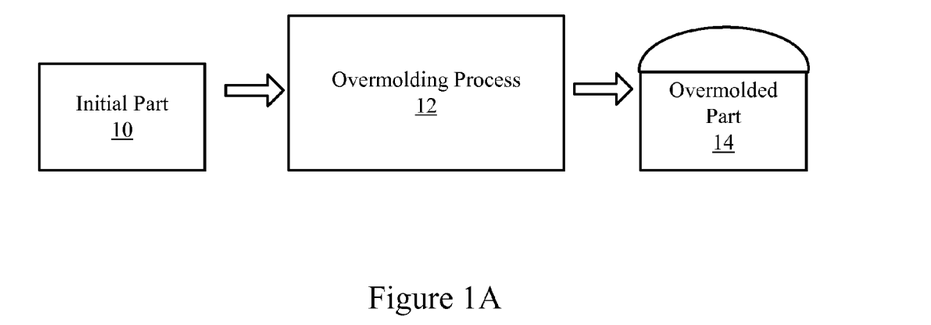
FIG. 1A is a block diagram illustrating formation of a part using overmolding in accordance with the described embodiments.
Figure 1B:
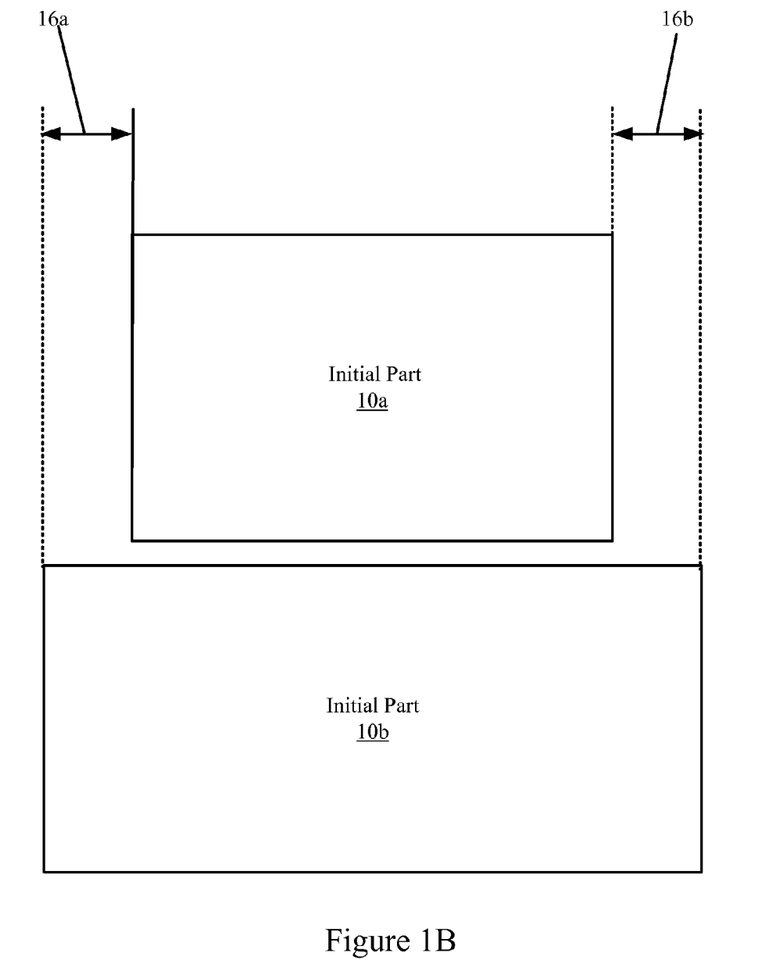
FIG. 1B shows a top view of two different parts accordance with the described embodiments.

In particular, the overmolding process and part tolerances are described with respect to FIGS. 1A-1B. With respect to FIGS. 2A-3B, the movement of a number of components of the mold unit relative one another in the region proximate to the part are discussed. In relation to FIGS. 4A-4B, the interactions of a clamping mechanism and a locking mechanism relative to one another and an initial part in the mold unit are described. With respect to FIG. 5, the geometry of the locking mechanism is discussed. An injection molding unit is described with respect to FIG. 6. Finally, a method of forming a part using the overmolding apparatus is discussed with respect to FIG. 7.

FIG. 1A is a block diagram illustrating formation of a part using overmolding. The initial part 10 can be formed from substrates such as but not limited to glasses, ceramics, metals, plastics or a combination of substrates. In one embodiment, the initial part 10 can include electronic circuitry. Thus, the initial part 10 can have been pre-formed using a number of processing steps prior to overmolding in 12.

The initial part 10 can be provided as an input to the overmolding process 12. During the overmolding process 12, the initial part 10 can be secured in place by one or more mechanisms. The mechanism for securing the initial part 10 in place can be referred to as a clamping mechanism. The initial part 10 can be delicate such that it may not be able to sustain a large clamping force without being damaged. For instance, the initial part 10 can be sufficiently thin and brittle such that a large clamping force can cause the initial part to fracture. In another example, the initial part can be more flexible but can include embedded components, such as electronic components, that can be damaged if the clamping force causes the initial part to deform too much.

During the overmolding process 12, the clamping force can be used to secure the initial part within a cavity. A mold unit in an injection molding apparatus can be used to provide the clamping force and to form the cavity. The mold unit can be coupled to injection material source that allows an injection material to be injected into the cavity. As is described in more detail below, the mold unit can include a number of components that move and interact with one another to allow a cavity to be formed and allow the initial part to be inserted and removed from the mold unit. An injection molding apparatus including a mold unit is described in more detail with respect to FIG. 6.

The initial part 10 can be secured via the clamping force such that it is in a particular orientation relative to the cavity. For instance, the initial part 10 can be centered within the cavity. As another example, the initial part 10 can positioned to one side of the cavity. The geometry of the cavity can be complex and asymmetric. Thus, these positioning examples are provided for the purposes of illustration only and are not meant to be limiting.

After the initial part 10 is clamped in place, the injection molding material can be injected into the cavity. The injection pressure can be fairly high, such as between 200 to 600 PSI. The injection pressure can be selected to fill the cavity within a certain period of time without damaging the initial part secured within the cavity. The injection speed can be controlled to affect the time period required to fill the cavity. For example, the injection speed can be adjusted to fill the cavity within a few a seconds.

After the material is injected into the cavity, the material can be allowed to cool. The cooling time can depend on the thermal conductivity of the initial part that is being overmolded, the thermal conductivity and temperature of the mold unit and geometry of the cavity, such as a maximum thickness of the cavity. In one embodiment, the initial part 10 can be pre-heated to provide better adhesion between the injection molding material and the initial part. In addition, the temperature of the surrounding mold units can also be controlled to affect the cooling process.

After some amount of time for cooling, an orientation of the mold unit can be changed to allow access to the newly formed overmolded part 14. The overmolded part 14 can be removed from the mold unit and then another initial part 10 can be placed in the mold unit and the process can be repeated. After the overmolded part 14 is removed, the part can be further processed using other manufacturing steps. For instance, the overmolded part can be polished or additionally shaped if desired.

At some point after the overmolding 12 is completed, in some embodiments, the overmolded part 14 can be used as a component in a device. The overmolded part can be added to the device during an assembly process. For instance, in one embodiment, the overmolded part can be a component that is assembled into electronic headphones.

FIG. 1B shows a top view of two different parts, such as parts 10a and 10b. The parts can be an initial part used in an overmolding process as described above with respect to FIG. 1A. The parts 10a and 10b are shown as simple rectangles of different sizes. However, the geometry of the parts can be complex and the rectangles are utilized for the purposes of illustration only and are not meant to be limiting. For instance, in various embodiments, the parts can include a number of different angled and curved surfaces.

Due to manufacturing tolerances, there can be some size variation from part to part. For example, part 10a can represent a minimum sized part in a batch of parts while initial part 10b can represent a maximum sized part in the batch of parts. The size difference between the parts 10a and 10b can be represented by dimensions 16a and 16b. Thus, the batch of parts can range in size between the part 10a and part 10b according to some distribution function. The size variations are shown only along one direction. In general, the size variations can vary in three dimensions across the surface of the part where an amount of size variation from part to part can be smaller or larger at different locations on the surface.

For the purposes of clamping the part in place for an overmolding process, all of the size variations across the surface of the part may not affect the positioning of the mold unit relative to the part. As is described in more detail below, one or more mold unit components can be used to clamp the part in place via contact between the mold unit components and the surface of the part where mold unit contacts the part at a limited number of surface locations. The size variations from part to part at the locations where the mold unit and the surface of the part typically contact one another can affect a position at which the mold unit components are placed relative to the part. However, at other locations, where the mold unit components and the part do not contact one another, the size variation of the part may not affect the positioning of the mold unit components relative to the part.

As previously described, the size variations from initial part to initial part in an overmolding process can be important when the initial part is fragile because clamping the part in the mold unit with too much force or in an incorrect position can damage the part or can lead to unacceptable flash on the overmolded part. As described in more detail below, a mold unit can be configured to accommodate initial parts used in an overmolding process that are fragile and have some variation in size from part to part. With respect to FIGS. 2A to 5, details of an embodiment of a mold unit used to secure a delicate part for an overmolding processing are described for the purposes of illustration.

Figure 2A:
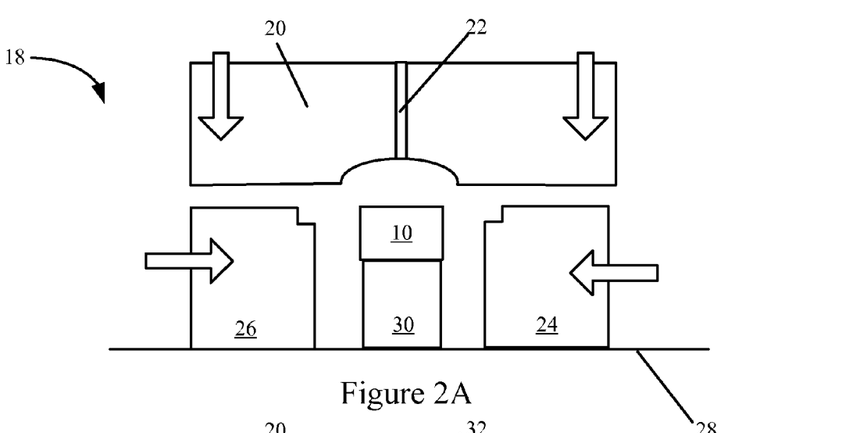
FIGS. 2A, 2B and 2C show side cross-sectional views of a portion of a mold unit in different operational positions in accordance with the described embodiments.
Figure 2B:
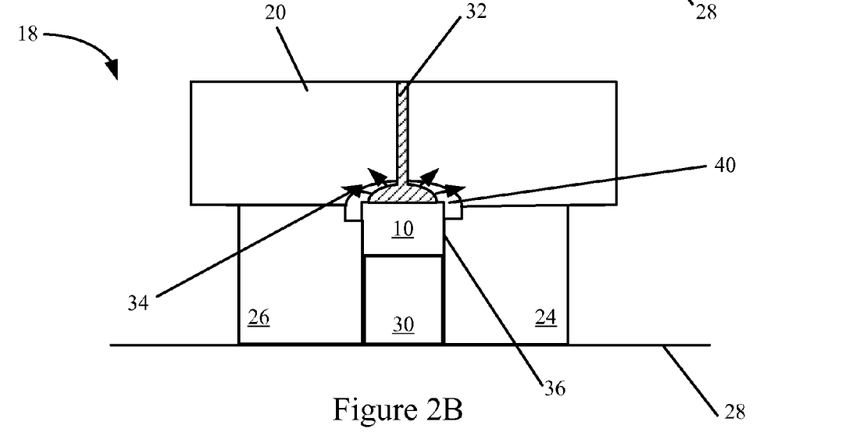
Figure 2C:
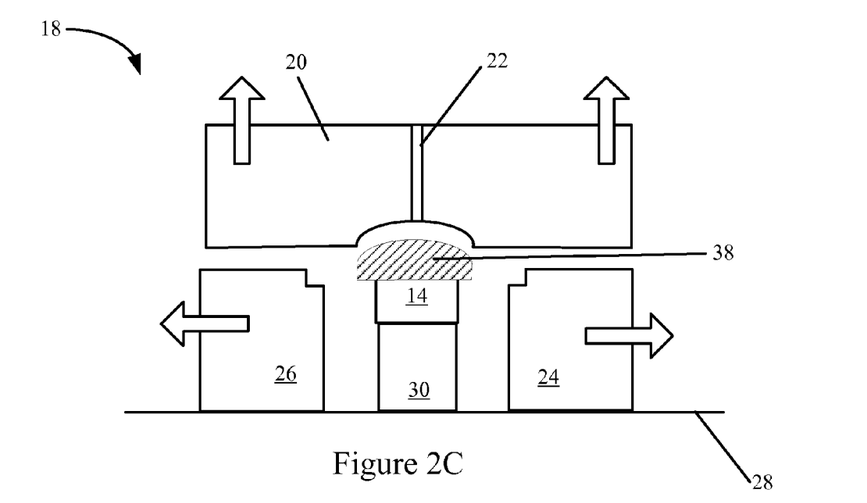

FIGS. 2A, 2B and 2C show side cross-sectional views of a portion of a mold unit in different operational positions during an overmolding process 12. The mold unit can include components that move relative to an initial part 10 placed in the mold unit and also move relative to one another. In one embodiment, the mold unit can include a support structure 30 for positioning the initial part within the mold unit. The initial part 10 can be placed on the support structure and then one more mold unit components can be moved relative to the support structure 30 such that the initial part can be clamp in place on the support structure 30 and a cavity can be formed around the initial part 10 where a shape of the cavity determines an overmold shape to be added to the initial part 10. To clamp the initial part 10 in place, portions of the one or more mold unit components can contact portions of the initial part.

In FIG. 2A, three mold unit components, 20, 24 and 26 are shown that can move relative to one another and the support structure 30. In particular embodiments, the mold unit components can be formed from a metal, such as stainless steel or aluminum. The mold unit components 24 and 26 can be configured to slide along a surface, such as 28, so that the mold unit components can be brought into contact with the initial part 10. The sliding surface 28 can be lubricated to facilitate the motion of the components 24 and 26. In one embodiment, the mold unit component 20 can be configured to be lowered toward the initial part 10 such that a portion of the mold unit component can rest on the mold unit components 24 and 26.

Mold unit component 20 includes a conduit 22 that allows injection molding material to be transferred into the mold unit 18 from a source outside of the mold unit. As is described in more detail with respect to FIG. 6, raw material can be added to an injection molding apparatus that is melted and then conducted into the mold unit. As is shown in FIG. 2B, when the components are brought together, a cavity 40 can be formed. Then, injection molding material 32 can be introduced into the conduit 22 such that it flows into the cavity 40 and fills the cavity. As the cavity 40 is filled, the injection molding material 32 can spread out 34 and partially surround the initial part 10.

As the cavity becomes filled, the injection molding material 32 can exert some pressure on the mold unit components 20, 24 and 26 that can push the components outward unless the components are secured in place. For example, if the mold unit component 24 is not secured in place, then it can be pushed away by the pressure exerted by the injection molding material 32 such that a gap opens up between the initial part and the mold unit component 24 along side 36. Then, injection molding material can then flow into the gap and an undesired flash can be formed around the initial part 10. If the amount of flash is too large, then the overmolded part 14 may not be suitable for its intended purpose, such as use as a component in an electronic device. One or more locking mechanism can be used to prevent the mold unit components, such as 24 and 26, from being pushed apart by the injection molding material 32. Details of locking mechanisms are described with respect to FIGS. 4A and 4B.

After the injection molding material 32 sets, the mold unit components, such as 20, 24 and 26 can be separated to allow the overmolded part 14 to be removed from the mold unit 18. In FIG. 2C, the mold unit components 20, 24 and 26 are shown in a separated position. In the separated position, the overmolded part 14 which includes the initial part 10 with an overmolded portion 38 can be removed from the support structure 30. Then, a new initial part can added to the support structure 30 and the process can be repeated.

In other embodiments, the mold unit 18 can be configured differently than shown in FIGS. 2A, 2B and 2C. For example, in one embodiment, all three mold unit components, 20, 24 and 26 can be sliders that are configured to slide along a surface and then be locked into place. In another example, the support structure 30 can be configured to allow for a single mold unit component or two mold unit components to be move relative to the support structure. For instance, a single mold unit component can be positioned such that it both clamps the initial part 10 in place and forms some cavity around the initial part 10 that is filled with injection molding material.

In yet another example, the cavity 40 in FIG. 2B, is partially formed by geometry associated with each of the components 20, 24 and 26. In other embodiments, the mold unit 24 and 26 may not contribute to the formation of the cavity 40. Instead, the cavity 40 may only be formed by geometry associated with mold unit component 20. In another example, a single conduit 22 is shown for injecting the molding material 32. In other embodiments, a mold unit 18 can include multiple injection conduits for adding material. For instance, mold unit components 20, 24 and 26 can each include a conduit for injecting material into the cavity 40.

Figure 3A:
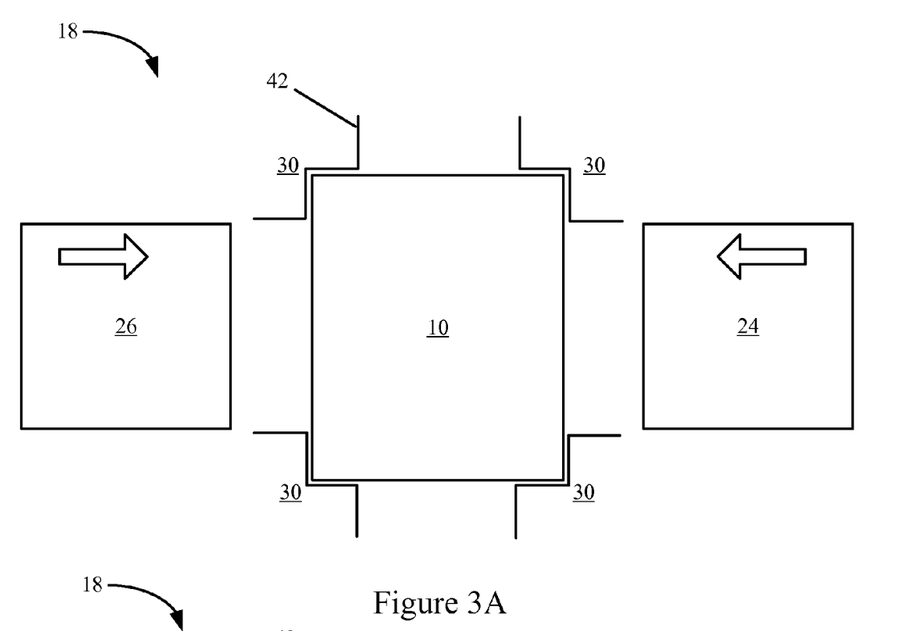
FIGS. 3A and 3B show top cross-sectional views of a portion of a mold unit in different operational positions in accordance with the described embodiments.
Figure 3B:
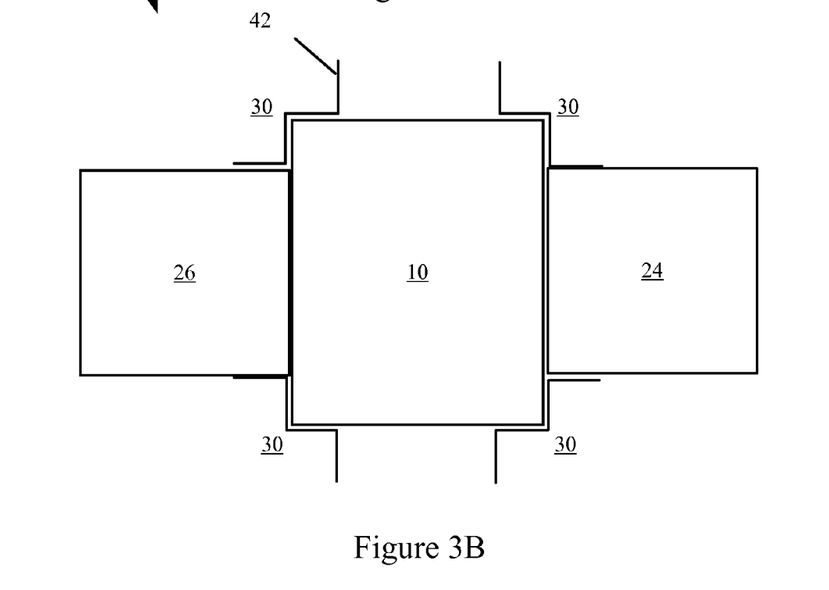

FIGS. 3A and 3B show top cross-sectional views of a portion of a mold unit 18 in different operational positions. In FIG. 3A, the sliders 24, 26 are in a separated position. In FIG. 3B, the sliders, 24 and 26, are brought into contact with the initial part 10 such that the initial part 10 is clamped into position. In various embodiments, the sliders can be positioned and locked into place in a serial manner or simultaneously. For instance, slider 24 can be positioned and locked into place and then slider 26 can be positioned and locked into place or sliders 24 and 26 can be positioned at the same time and then each locked into place.

As is shown in FIGS. 3A and 3B, the support structure 30 can include features, such as 42, that help to align and hold the initial part 10 within the support structure. The features, such as 42, can also help to guide the sliders, such as 24 and 26, along a path as the support structure 30 is approached. In the example in FIGS. 3A and 3B, the support structure 30 is configured to allow sliders to approach the initial part from opposite sides along a common line and then clamp the initial part 10 in place. In one embodiment, mold unit 18 and the support structure 30 can be configured to allow a single slider to clamp the initial part in place. In another embodiment, the mold unit and the support structure 30 can be configured to allow the two sliders, 24 and 26, to approach the initial part along different lines that are angled to one another. For instance, the mold unit 18 can be configured to allow the sliders, 24 and 26, to approach the support structure along lines that are perpendicular to one another. In yet another embodiment, more than two sliders can be used. For instance, four sliders perpendicular to one another can be used to clamp the part 10 on each side.

As described above, the initial part 10 used in an overmolding process can be clamped into place by a mechanism during the overmolding process. The mechanism can be designed such that the clamping does not damage the part. To account for part variations, it can be clamped at different positions each time and then locked into place at a different position. Further details of a mold unit with a clamping mechanism and a locking mechanism that enable these functions are described in more detail with respect to FIGS. 4A and 4B as follows.

Figure 4A:
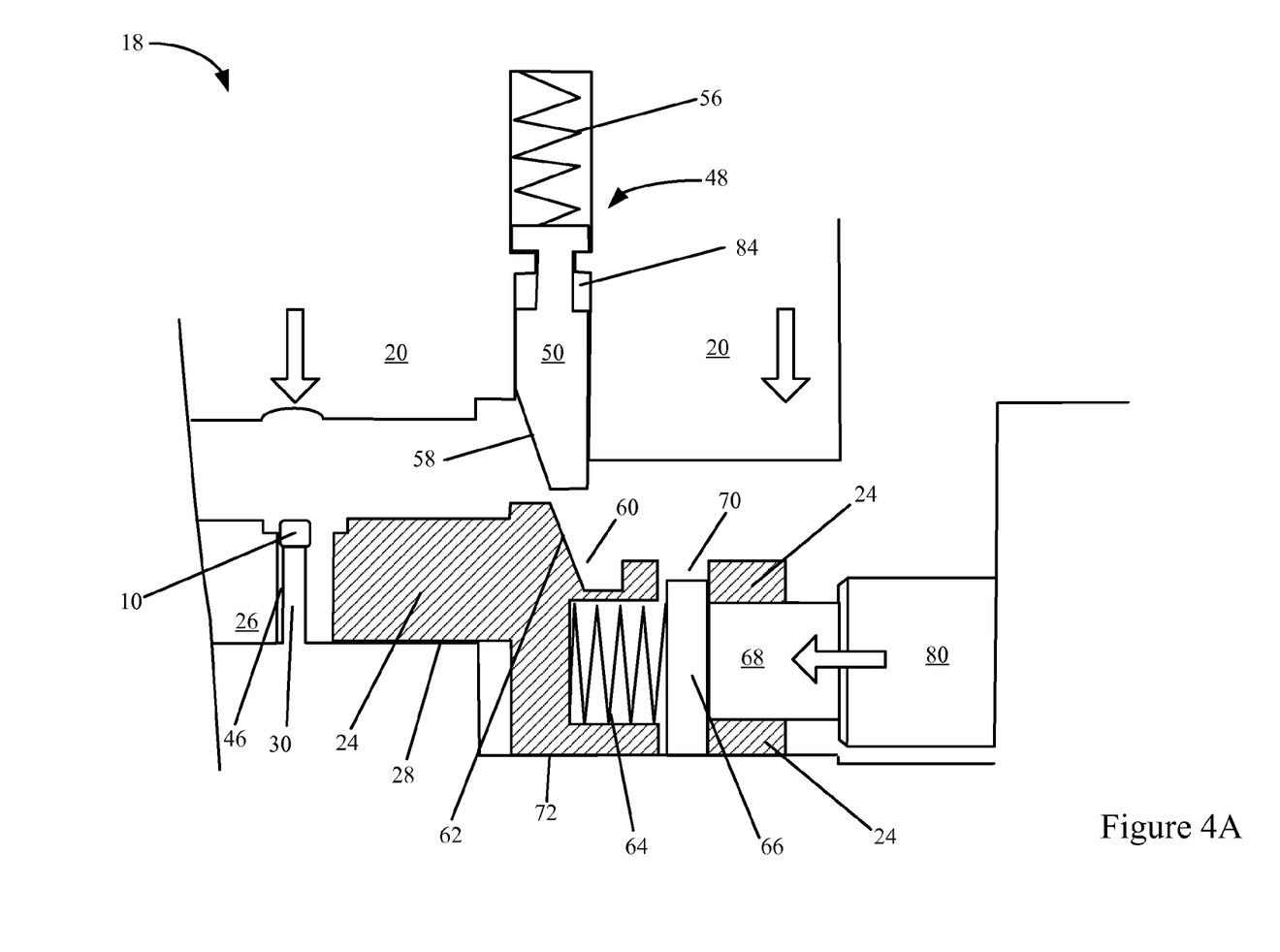
FIGS. 4A and 4B show side cross-sectional views of a mold unit including a clamping mechanism and a locking mechanism in accordance with the described embodiments.
Figure 4B:
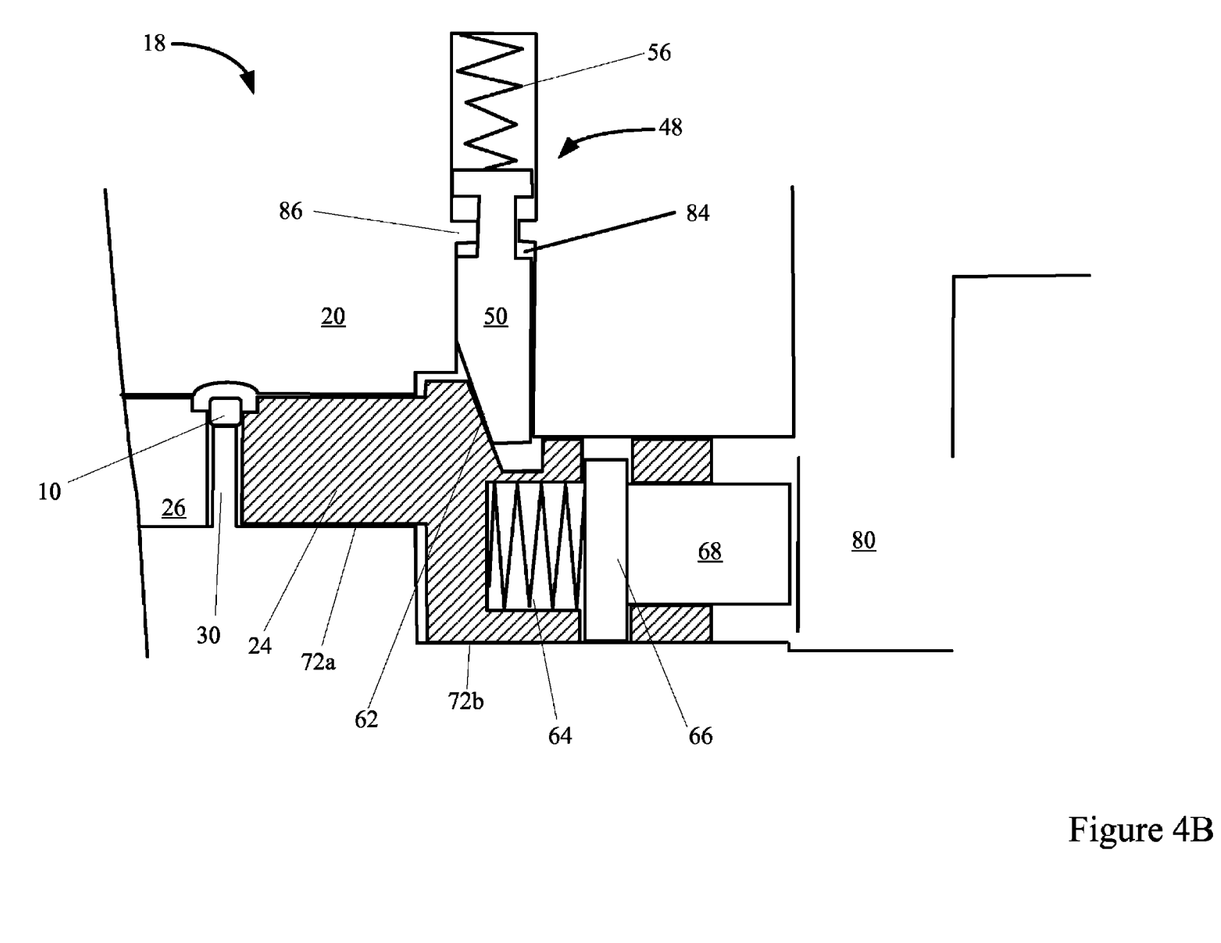

FIGS. 4A and 4B show side cross-sectional views of a mold unit 18 including clamping mechanism 24, clamping mechanism 26 and a locking mechanism 48. The locking mechanism 48 can be configured to lock the clamping mechanism 24, which is shown as a part that slides, into place after the clamping mechanism is positioned relative to the part 10 and the support structure 30. The clamping mechanism 26 is shown in a position against part 10 where there is a small gap 46 between the clamping mechanism 26 and the support structure 30. In this position, when the mold unit 20 is lowered, the clamping mechanism 26 can be locked into place via a locking mechanism. The locking mechanism, which can be similar to locking mechanism 48 is not shown.

The clamping mechanism 24 can be configured to slide along one or more surfaces, such as surface 28 and surface 72. The clamping mechanism can be moved towards and away from the initial part 10 and support structure 30 via a piston 68 coupled to an actuator 80. The piston 68 can include a head 66. The piston 68 and the piston head 66 can be coupled to the clamping mechanism 24, such that the clamping mechanism 24 can move relative to the piston head. The amount of relative movement between the clamping mechanism 24 and the piston head can be constrained in some manner. For instance, as shown in FIGS. 4A and 4B, the piston head 66 is shown embedded within the clamping mechanism 24 such that an amount of movement of the clamping mechanism 24 relative to the piston head 66 is constrained by a width of a cavity 70 in which the piston head 66 can be disposed.

The piston head 66 can be configured to push the clamping mechanism 24 towards the initial part. In one embodiment, the piston head 66 can be configured to extend to a fixed position each time. The fixed location for the piston head 66 can be selected such that the clamping mechanism 24 does not initially contact the part 10. In addition to the piston head being able to move the slider, a secondary force mechanism 64 can be used to move the clamping mechanism 24 into contact with the part 10. The secondary force mechanism 64 can be configured so that the clamping mechanism 24 exerts a maximum force against the part 10 that is less than a threshold force value. The threshold force value can be selected to be less than an amount that can damage the part 10. As described above with respect to FIG. 1B, there can be a size variation between parts where some parts are smaller or larger than one other. Thus, the location where the clamping mechanism 24 contacts the part and the relative position of the clamping mechanism 24 relative to the piston head 66 can change as different parts are placed in molding unit 18 for overmolding.

In one embodiment, the secondary force mechanism 64 can be a spring of some type, such as a helical spring. The spring can be coupled to the piston head 68 and the clamping mechanism 24 such that the clamping mechanism can be moved relative to the piston head 66. For example, in FIG. 4A, the spring is shown disposed within a cavity within the clamping mechanism 24 where a portion of spring can contact the piston head 68 and a portion of the spring can contact the clamping mechanism.

When the piston head 68 is moved forward, the spring can be compressed. Then, when the piston head stops moving, the spring can continue to push the clamping mechanism 24 forward until it is brought in contact with the part 10. The speed of the piston 66 can be controlled so that when the piston 66 stops, the momentum of the clamping mechanism 24 does not cause it to continue move forward and hit the part with a force that can damage the part 10.

In one embodiment, a linear spring can be used. The spring constant can be calculated to move the clamping mechanism 24 forward such that it contacts the part with a force value that is less than a threshold value that can damage the part. In alternate embodiments, multiple springs can be used. For instance, two springs one in compression and one in tension can be used where the spring in tension can be used to keep the clamping mechanism 24 from moving away too quickly from the piston head 66, such as when the piston 68 is brought towards the initial part and then stopped.

After the clamping mechanism 24 is brought into position against the initial part, the position of the clamping mechanism 24 can be locked into place. In one embodiment, a locking mechanism, such as 48, can be employed. The locking mechanism 48 includes an insert 50 that is configured to be received into a cavity 60 in the clamping mechanism 24 when the clamping mechanism 24 is positioned against the part 10. In some embodiments, the clamping mechanism 24 may not include a cavity. Instead, the clamping mechanism 64 can include a surface, such as 62, in which the insert 50 of the locking mechanism 48 can contact.

As the locking mechanism 48 is brought closer to the clamping mechanism 24, a surface portion of insert, such as 58, can be brought into contact with a surface portion, such as 62, of the clamping mechanism 24. The locking mechanism 48 can include a force generating mechanism 56 configured to affect the force at which the insert 50 pressed against the clamping mechanism 24. In various embodiments, the geometry of the insert 50 and the clamping mechanism 24 can vary. However, the parts can be shaped such that a surface portion of each part is brought into contact with one another at some point during the movement of the parts relative to one another.

When the insert 50 is brought into a contact with the clamping mechanism 24, a portion of the force generated by the insert 50 can be transferred through the clamping mechanism 24 and into the part 10. Thus, the force exerted by the clamping mechanism 24 on the part 10 can be increased when insert 50 is brought into contact with the clamping mechanism 24. The force generating mechanism 56 can be configured such that the force generated by the clamping mechanism 24 on the part does not exceed the threshold force value where the part can be damaged is not exceeded. Further, the force generating mechanism 56 can be configured to exert a sufficient amount of force on the insert such that if injection pressure from the injection molding material pushes the clamping mechanism 24 away from the part 10, the insert 50 will remain proximately in place and not be pushed upwards allowing the clamping mechanism to move backwards by a significant amount. As described above, if the clamping mechanism 24 is pushed away from the part 10 during overmolding, then an undesirable flash can be formed on the part.

In different embodiments, the force generating mechanism 56 can be configured to push or pull against the insert 50. For example, if the insert 50 is pushed against the clamping mechanism 24 via the force of gravity and the force exerted by the insert 50 is too great then the force generating mechanism can be configured to pull against the force of gravity such that the force exerted by the insert is reduced. In another example, the force exerted by the insert 50 resulting from gravitational attraction may not be large enough to lock the insert 50 in place and the force generating mechanism 56 can be configured to push against the insert 50 to increase the force it exerts on the clamping mechanism. In one embodiment, the insert 50 can be sized such that gravitational force is sufficient to lock the insert 50 in place and a force generating mechanism 56 may not be used.

In particular embodiments, the force generating mechanism 56 can include one or more springs. In one embodiment, the springs can be proximately linear springs. Spring constants for the one or more linear springs can be selected such that the force exerted on the part 10 does not exceed the threshold force value. Further, the spring constants can be selected such that the insert 50 keeps the clamping mechanism 26 can be locked into a proximately fixed position during the injection molding process.

In one embodiment, one or more locking mechanisms, such as locking mechanism 48, can be integrated into one of the mold unit components, such as component 20. As a mold unit component, such as 20, is brought towards one or more mold unit components that can be locked in place via the one or more locking mechanisms, each of the locking mechanisms can be brought into contact with a mold unit component to lock it into place. The point of the contact between the locking mechanism and the mold unit can depend on the respective geometries of the locking mechanism and the mold unit components to be locked into place. As an example, mold unit 20 can include two locking mechanisms, similar to locking mechanism 48, that can be brought towards each of the clamping mechanisms 24 and 26 to lock each of them into place.

The mold unit and the locking mechanism can be configured to allow a portion of the locking mechanism to move relative to the mold unit such that the movement of the mold unit does not add to the force generated by the locking mechanism. For instance, insert 50 can be disposed within a channel 84 within mold unit component 20. As the insert 50 is brought into contact with the clamping mechanism 24, the insert 50 can slide into position and stop moving closer towards the clamping mechanism 24. However, the molding unit 20 can continue to move towards the clamping mechanism 24 after the insert 50 reaches its locked-in position because the channel 84 provides room for the insert to move relative to the mold unit component 20. As can be seen FIG. 4B, when the mold unit component 20 and the insert 50 are brought towards a position suitable for injection molding to begin, the insert 50 has moved some distance up channel 84 as compared to FIG. 4A.

In FIG. 4B, the injection molding material can be injected to overmold part 10. After the injected material has set, the mold unit component 20 can be pulled away from the part 10 and the clamping mechanism 24. When the mold unit component 20 is first pulled away, the insert 50 can remain in place while the mold unit component 20 is moving. The mold unit component can include a feature, such as ledge 86, that can engage a portion of the insert 50. As insert 50 moves down channel 84, the ledge 86 can engage the insert such that the insert is pulled away from the clamping mechanism 24. The insert 50 can be pulled far enough away to allow the clamping mechanism 24 to be pulled away from the part 10 using piston 68 and actuator 80 without the insert and the clamping mechanism hitting one another. The overmolded part can then be removed and a new initial part 10 can be added to the mold unit 18 and the overmolding process can be repeated.

In various embodiments, the clamping mechanisms, such as 24 and 26, and the mold unit component 20 can each be controlled by a separate actuator, such as 80. When configured in this manner, the motion of each part can be controlled independently of one another. In other embodiments, the clamping mechanisms and the mold unit components can be coupled together in a manner such that a single actuator, such as 80, affects the motion of two or more mold unit components. For instance, depending on the configuration of the mold unit 18, the actuator 80 can be used to affect the motion of 1) the clamping mechanisms, 24 and 26, 2) the clamping mechanism 24 and the mold unit 20 or 3) the clamping mechanisms, 24 and 26 and the mold unit component 20.

Figure 5:
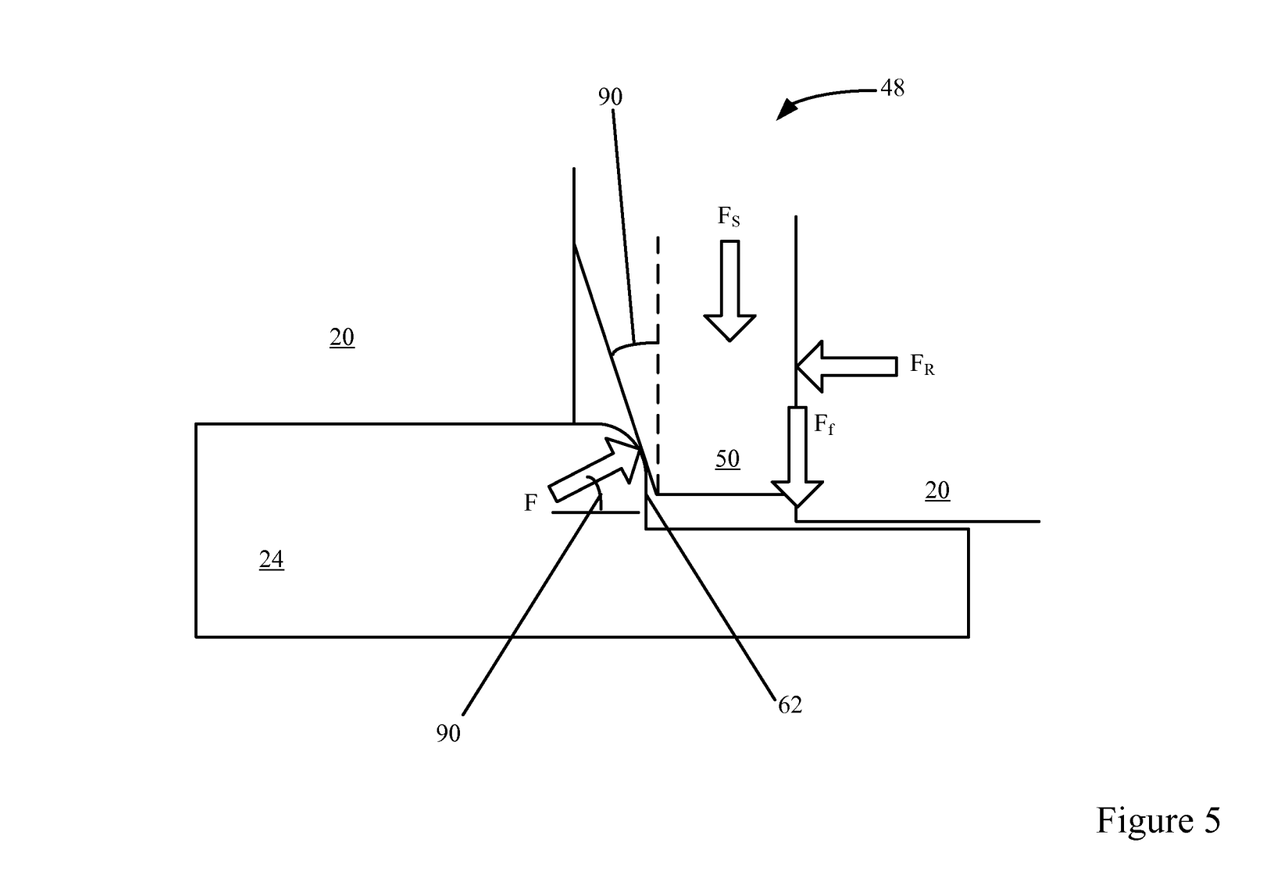
FIG. 5 is a block diagram illustrating an interface between a locking mechanism and a clamping mechanism in accordance with the described embodiments.

FIG. 5 is a block diagram illustrating an interface between a locking mechanism 48 and a clamping mechanism 24 in accordance with the described embodiments. In one embodiment, the geometry of the insert 50 can include a wedge portion. The wedge portion can include angle 90. The insert 50 and the clamping mechanism 24 can be configured such that a surface of the wedge portion can slide against a curved surface 62 of the clamping mechanism 24 to lock the clamping mechanism into place. The curved surface 62 can have some radius of curvature which can be varied.

When the insert of the locking mechanism is in place, the clamping mechanism 24 can proximately exert a force "F" through contact point between the insert and the curved surface 62. During overmolding, the force "F" can be increased due to the force of the injected material pushing against the clamping mechanism 24. The force "F" can be exerted normal to the surface of the wedge portion and its directional components can be related to the wedge angle 90.

A static analysis of the forces acting on the insert indicates that the force "$F_R$" is proximately equal to the force "F" times the cosine of angle 90. Further, the force "$F_f$" due to static friction is proximately "$F_R$" times the coefficient of static friction. This coefficient can vary depending on the type materials used to form the insert 50 and the clamping mechanism 24 as well as a type of lubricant used between of the insert and the clamping mechanism. The force "$F_S$" can include the force produced from a force generating mechanism (such as 56 in FIG. 4A) and the weight of the insert 50 depending on its orientation.

Independent of the geometry of the insert 50 and the clamping mechanism 24, it is desired that the forces pushing down on the insert are greater than the forces pushing up on the insert so that the insert 50 does move out of place allowing the clamping mechanism 24 to move out of position. In general, the insert 50 and clamping mechanism 24 interface can be designed so that this condition is met for a range of pressures that the clamping mechanism 24 is expected to receive during injection. Continuing the static analysis for the geometry shown in FIG. 5, the force pushing up on the insert 50 can be approximated as the force "F" times the sine of the angle 90. The forces pushing down on the insert 50 can be approximated as the forces "$F_S$" and "$F_f$".

If "$F_S$" is assumed to be small relative to "$F_f$", it can be shown that the forces pushing down on the insert 50 will be greater than the forces pushing up on the insert independent of the value of force "F" as long as the angle 90 is less than the arctangent of the static coefficient of friction. Thus, an advantage of this geometry configuration is that as long as the angle 90 is less than some threshold value determined by the coefficient of static friction, then the insert 50 will not be pushed up independent of the force "F" pushing against the insert. Thus, the locking mechanism can be suitable for a wide range of injection pressures.

Figure 6:
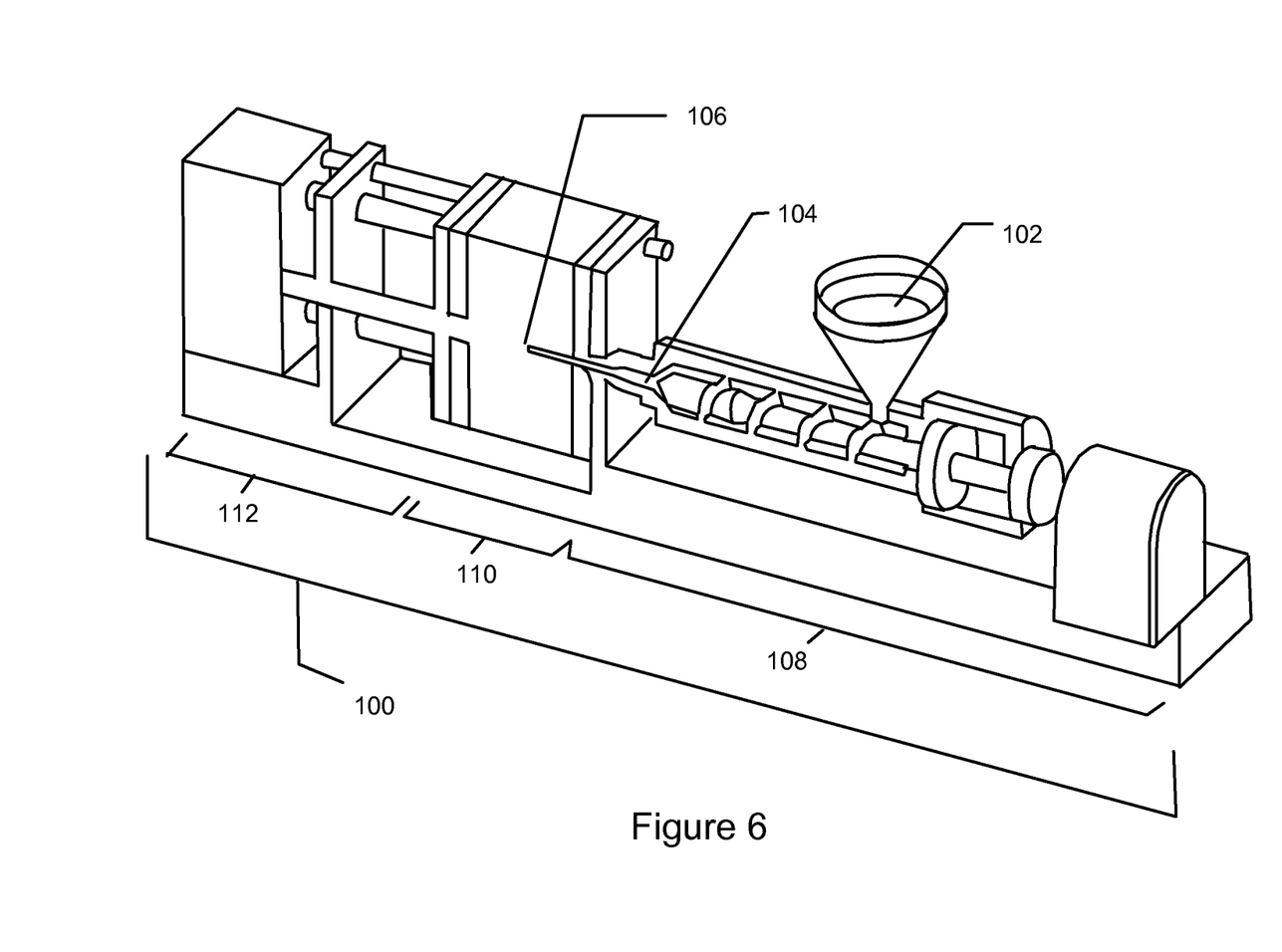
FIG. 6 shows a perspective cross-sectional view of an injection mold unit in accordance with the described embodiments.

FIG. 6 shows a perspective cross-sectional view of an injection molding apparatus 100. The injection mold apparatus can include an injection unit 108 into which raw material 102 can be added. In one embodiment, the raw material can be provided as a pellet. The raw material 102 can be a polymer, such as a thermoplastic polymer, a thermosetting polymer or an elastomeric polymer. There are many different types of materials and material mixtures that can be used in an injection mold unit, such as 108. A few examples of materials include but are not limited to nylon, polyethylene, polystyrene, epoxy and phenolic.

After the material is added to the injection unit 108, the raw material 102 can be heated and melted. Then, the melted material can be forced into the mold unit 110. In FIG. 6, the injection unit 108 includes a screw-like device that is configured to force the melted material 104 into the mold unit 110. Under pressure, the melted material 104 can be forced into a cavity 106 to form a molded part. After the material injected into the cavity sets, a newly formed part can be removed from the mold unit 110. In particular embodiments, the cavity 106 can at least partially surround a pre-formed part placed in the mold unit such that an overmold layer is formed over the pre-formed part during the injection molding process.

The mold unit 110 can include a number of components, such as sliders and locking mechanisms, which can be separated and brought together in the manner described above with respect to FIGS. 2A-5. The mold control unit 112 can be used to control movement of the components of the mold unit 110. The mold control unit 112 can include one or more actuators that allow the motion of the components in mold unit to be moved. As an example, the mold control unit 112 can include actuators that can be configured to 1) separate the components of the mold unit 110 so that a pre-formed part can be placed in the unit 110, 2) bring the components together so that a cavity is formed around the pre-formed part to allow for over molding around the pre-formed part and 3) separate the components so that a newly formed overmolded part can be removed from the mold unit 110. Then, a new pre-formed part can be added to the mold unit and the process can be repeated.

Figure 7:
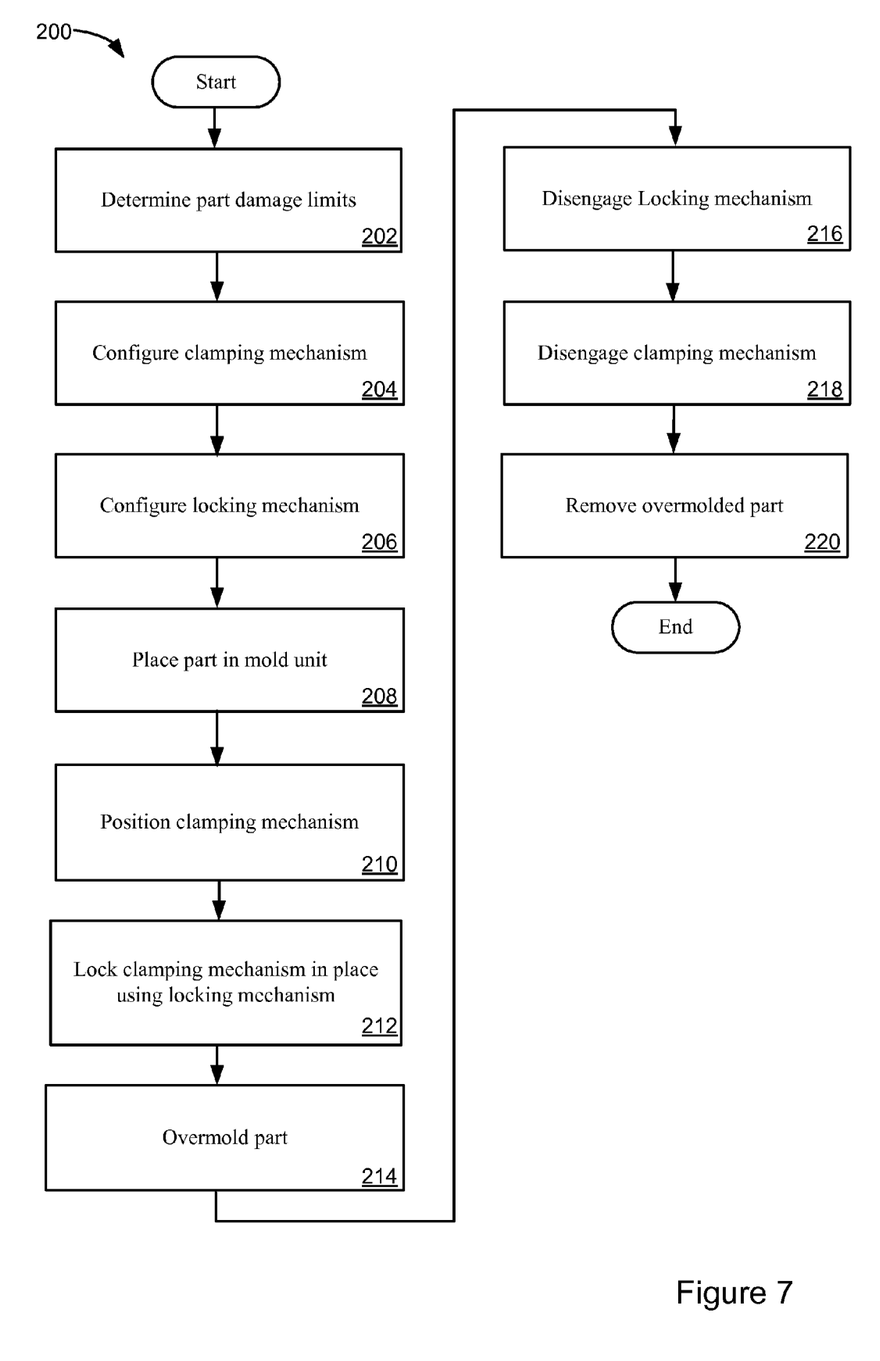
FIG. 7 shows a method of overmolding a part in accordance with the described embodiments.

FIG. 7 shows a method 200 of overmolding a part in accordance with the described embodiments. In 202, the damage limits for pre-formed that is to be used as an initial part in an overmolding process can be processed. The damage limits can be used to determine a force threshold value that is not to be exceeded by a clamping mechanism used in a mold unit during the overmolding process.

In 204 and 206, a clamping mechanism for clamping the initial part and a locking mechanism for locking the clamping mechanism in place can be designed. The design can include determining geometries for each of the parts including interface geometry where the two parts can come in contact with one another. In one embodiment, as described with respect to FIG. 5, the interface geometry can include a curved surface on the clamping mechanism that can be brought into contact with an angled surface portion of the locking mechanism.

Further, the design can include configuring secondary force generating mechanism for each of the parts. A secondary force generating mechanism can be configured on the clamping mechanism to bring the clamping mechanism into contact with the initial part without damaging the initial part which can be fragile. A secondary force generating mechanism can be configured on the locking mechanism to keep a portion of the locking mechanism in contact with the clamping mechanism. In particular embodiments, the secondary force generating mechanisms can each include one or more springs.

In 208, an initial part can be placed in a mold unit including the clamping mechanism and the locking mechanism described in 204 and 206. In one embodiment, the initial part can be placed on a support structure that can help to align the initial part in a preferred orientation. In 210, one or more clamping mechanisms can be brought into contact with the initial part that is to be overmolded. The clamping mechanisms can include features that form a portion of a cavity around the initial part. The clamping mechanism can be positioned such that the initial part is not damaged. The initial part can vary in size from part to part. Thus, the clamping mechanism can be positioned differently for different parts depending on the size of the part.

In 212, the clamping mechanism can be locked into position via the locking mechanism. The locking mechanism can be configured to not push the clamping mechanism into the initial part with additional force such that the force is damaged and prevent the clamping mechanism from moving away from the initial part due to an injection molding pressure on the clamping mechanism. In 214, the part can be overmolded. The overmolding can involve injecting a material into a cavity surrounding the part. The cavity can be formed by geometry associated with a number of components in the mold unit including the clamping mechanism.

In 216, the locking mechanism can be disengaged to allow the clamping mechanism to move away from the part. In 218, the clamping mechanism can be moved away from the part. In 220, the overmolded part can be removed from the mold unit. If desired, a new initial part can be placed in the mold unit and the process can be repeated from step 208.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium for controlling manufacturing operations or as computer readable code on a computer readable medium for controlling a manufacturing line. The computer readable medium is any data storage device that can store data which can thereafter be read by a computer system. Examples of the computer readable medium include read-only memory, random-access memory, CD-ROMs, DVDs, magnetic tape, optical data storage devices, and carrier waves. The computer readable medium can also be distributed over network-coupled computer systems so that the computer readable code is stored and executed in a distributed fashion.

The foregoing description, for purposes of explanation, used specific nomenclature to provide a thorough understanding of the invention. However, it will be apparent to one skilled in the art that the specific details are not required in order to practice the invention. Thus, the foregoing descriptions of specific embodiments of the present invention are presented for purposes of illustration and description. They are not intended to be exhaustive or to limit the invention to the precise forms disclosed. It will be apparent to one of ordinary skill in the art that many modifications and variations are possible in view of the above teachings.

The embodiments were chosen and described in order to best explain the principles of the invention and its practical applications, to thereby enable others skilled in the art to best utilize the invention and various embodiments with various modifications as are suited to the particular use contemplated.

It is intended that the scope of the invention be defined by the following claims and their equivalents.

While the embodiments have been described in terms of several particular embodiments, there are alterations, permutations, and equivalents, which fall within the scope of these general concepts. It should also be noted that there are many alternative ways of implementing the methods and apparatuses of the present embodiments. For example, there are many different types of springs that can be used as part of a force generating mechanism. It is therefore intended that the following appended claims be interpreted as including all such alterations, permutations, and equivalents as fall within the true spirit and scope of the described embodiments.

What is claimed is:

1. A mold unit, comprising:
    a plurality of mold unit components that cooperate to define at least a portion of a mold unit cavity, wherein each mold unit component of the plurality of mold unit components is in direct contact with an initial part during an overmolding operation;
    a single conduit configured to inject an amount of molding material that fills the mold unit cavity, wherein the plurality of mold unit components remain substantially stationary while the molding material is injected so that the mold unit cavity maintains a fixed volume throughout the overmolding operation;
    a force generating mechanism that exerts a force upon a first mold unit component of the plurality of mold unit components during the overmolding operation, the force being transferred to the initial part by way of the first mold unit component, wherein the force generating mechanism moves in a first direction to place the first mold unit component in contact with the initial part prior to the overmolding operation; and
    a wedge configured to move in a second direction different from the first direction to directly contact a surface of the first mold unit component to prevent the first mold unit component from moving away from the initial part during the overmolding operation, thereby substantially maintaining both the force against the initial part and the fixed volume of the mold unit cavity throughout the overmolding operation.

2. The mold unit as recited in claim 1, wherein the single conduit is disposed through an additional mold unit component different from the plurality of mold unit components that cooperates with the plurality of mold unit components to define the mold unit cavity.

3. The mold unit as recited in claim 2, wherein the wedge is disposed within a channel arranged within the additional mold unit component, such that the wedge is driven by movement of the additional mold unit component.

4. The mold unit as recited in claim 3, wherein the additional mold unit component and the wedge move in the second direction, while the first mold unit component and the force generating mechanism move in the first direction, and wherein the wedge is separate and distinct from the force generating mechanism.

5. The mold unit as recited in claim 2, wherein the wedge is substantially maintained against a surface of the additional mold unit component by a frictional force between the wedge and the surface of the additional mold unit component.

6. The mold unit as recited in claim 1, wherein the force generating mechanism is a first force generating mechanism, the mold unit further comprising a second force generating mechanism configured to exert an additional force upon a second mold unit component of the plurality of mold unit components during the overmolding operation, the additional force being transferred to the initial part by way of the second mold unit component.

7. An injection molding apparatus for conducting an overmolding operation, comprising:
    a single conduit configured to inject an amount of molding material that fills a cavity during the overmolding operation;
    a mold unit component that defines a portion of the cavity;
    a force generating mechanism configured to extend in a first direction to move the mold unit component into contact with an initial part and to apply a predetermined force to the initial part disposed within the cavity by way of the mold unit component, the predetermined force corresponding to a pressure that prevents formation of flash between the initial part and the mold unit component without causing the initial part to deform; and
    a locking mechanism configured to move in a second direction different than the first direction to place the locking mechanism in direct contact with the mold unit component to substantially maintain the predetermined force against the initial part and prevents the mold unit component from moving away from the initial part so that a volume of the cavity remains substantially fixed while the cavity is being filled with molding material.

8. The mold unit as recited in claim 7, wherein the locking mechanism is arranged along a first axis and the force generating mechanism is arranged along a second axis different from the first axis, and wherein the locking mechanism is separate and distinct from the force generating mechanism.

9. The mold unit as recited in claim 8, wherein the locking mechanism comprises a wedge configured to directly contact the second portion of the mold unit component.

10. The mold unit as recited in claim 7, further comprising a plurality of mold unit components that cooperate to define the cavity, wherein each mold unit component of the plurality of mold unit components moves during the overmolding operation.

11. The mold unit as recited in claim 10, further comprising:
    a plurality of force generating mechanisms,
        wherein each of the mold unit components has a corresponding force generating mechanism.

12. The mold unit as recited in claim 10, further comprising:
    a support structure for holding the initial part, at least until the force generating mechanism applies the predetermined force to the initial part by way of the mold unit component, wherein the support structure is separate and district from the plurality of mold unit components.

13. A mold unit for forming an overmolded structure in cooperation with an initial part, the mold unit comprising:
    a plurality of mold unit components, each of the mold unit components configured to move into direct contact with the initial part to both define at least a portion of a mold unit cavity and secure an initial part with a clamping force, the clamping force provided by a force generating mechanism that exerts the clamping force directly to each mold unit component from the plurality of mold unit components, wherein each of the mold unit components has a corresponding force generating mechanism; and
    a plurality of locking mechanisms, each of the plurality of locking mechanisms comprising a wedge, each wedge configured to move into direct contact with a corresponding one of the plurality of mold unit components, and to substantially maintain a fixed volume of the mold unit cavity throughout an overmolding operation by preventing the corresponding mold unit component from moving away from the initial part when molding material injected into the mold unit cavity exerts pressure upon the mold unit components that biases the mold unit components away from the initial part.

14. The mold unit as recited in claim 13, further comprising an additional mold unit component different from the plurality of mold unit components, wherein the additional mold unit cavity defines a conduit for injecting molding material into the mold unit cavity.

15. The mold unit as recited in claim 13, wherein each of the force generating mechanisms comprises a spring configured to exert the clamping force directly to each corresponding mold unit component.

16. The mold unit as recited in claim 13, further comprising:
   a conduit configured to deliver an amount of molding material for the overmolding operation into the mold unit cavity.

17. The mold unit as recited in claim 1, wherein the force generating mechanism is configured to accommodate size variations in the initial part by adjusting a position at which the first mold unit component contacts the initial part during the overmolding operation.

18. The mold unit as recited in claim 2, further comprising a support structure configured to both hold the initial part and remain fixed during the overmolding operation, wherein the support structure is separate and distinct from the plurality of mold unit components and the additional mold unit component.

19. The mold unit as recited in claim 7, wherein a position of the mold unit component before the overmolding operation is variable such that the force generating mechanism and the locking mechanism are configured to accommodate a size variation between initial parts.

20. The mold unit as recited in claim 13, wherein the plurality of locking mechanisms move along a first axis and the plurality of mold unit components move along a second axis different from the first axis.

* * * * *

UNITED STATES PATENT AND TRADEMARK OFFICE
CERTIFICATE OF CORRECTION

PATENT NO. : 8,974,224 B2  
APPLICATION NO. : 13/043289  
DATED : March 10, 2015  
INVENTOR(S) : Craig M. Stanley Page 1 of 1

It is certified that error appears in the above-identified patent and that said Letters Patent is hereby corrected as shown below:

In the Claims:

Column 16, line 26 (Claim 8, line 1): "mold unit" should read -- molding apparatus --.

Column 16, line 31 (Claim 9, line 1): "mold unit" should read -- molding apparatus --.

Column 16, line 34 (Claim 10, line 1): "mold unit" should read -- molding apparatus --.

Column 16, line 39 (Claim 11, line 1): "mold unit" should read -- molding apparatus --.

Column 16, line 44 (Claim 12, line 1): "mold unit" should read -- molding apparatus --.

Signed and Sealed this  
Ninth Day of June, 2015

Michelle K. Lee  
*Director of the United States Patent and Trademark Office*